(12) United States Patent
Poole et al.

(10) Patent No.: US 12,246,783 B2
(45) Date of Patent: Mar. 11, 2025

(54) SELF-STORING SLIDING HYDRAULIC BOOSTER FOR TRAILER

(71) Applicant: E.D. Etnyre & Co., Oregon, IL (US)

(72) Inventors: Ken Poole, Oregon, IL (US); Justin Blackwell, Daingerfield, TX (US)

(73) Assignee: E.D. Etnyre & Co., Oregon, IL (US)

( * ) Notice: Subject to any disclaimer, the term of this patent is extended or adjusted under 35 U.S.C. 154(b) by 773 days.

(21) Appl. No.: 17/487,457

(22) Filed: Sep. 28, 2021

(65) Prior Publication Data

US 2022/0097781 A1 Mar. 31, 2022

Related U.S. Application Data

(60) Provisional application No. 63/084,876, filed on Sep. 29, 2020.

(51) Int. Cl.
*B62D 53/06* (2006.01)

(52) U.S. Cl.
CPC ......... *B62D 53/067* (2013.01); *B62D 53/061* (2013.01)

(58) Field of Classification Search
CPC ... B62D 53/067; B62D 53/061; B62D 61/125
See application file for complete search history.

(56) References Cited

U.S. PATENT DOCUMENTS

| | | | |
|---|---|---|---|
| 2,967,720 A | 1/1961 | Smith et al. | |
| 5,407,251 A * | 4/1995 | Ritchie, II | B60P 1/273 280/43.23 |
| 5,460,332 A * | 10/1995 | Frick | B02C 21/02 241/266 |
| 5,601,303 A * | 2/1997 | Underwood | B60P 1/027 280/475 |
| 6,315,311 B1 * | 11/2001 | Mathiowetz | B62D 61/125 180/209 |
| 9,598,126 B2 * | 3/2017 | Strong | B62D 53/068 |
| 10,543,875 B2 * | 1/2020 | Morena | B62D 65/00 |
| 2009/0194000 A1 * | 8/2009 | Jacob | B60F 1/005 105/72.2 |
| 2015/0084314 A1 | 3/2015 | Ingels et al. | |
| 2019/0118605 A1 * | 4/2019 | Strong | B60G 17/005 |
| 2019/0359272 A1 * | 11/2019 | Stross | B62D 53/068 |
| 2023/0174178 A1 * | 6/2023 | Andringa | B28C 5/4248 280/86.5 |
| 2024/0042971 A1 * | 2/2024 | Di Biase | F16M 13/02 |

OTHER PUBLICATIONS

E.D. Etnyre & Co., MO-RTN-05, RTN Series Trailer Operation Manual, Serial No. Q27423 and Up, Blackhawk Trailers, 47 pages.
E.D. Etnyre & Co., L-RTN-06, Blackhawk, Classic Series, Heavy Duty Trailers, 4 pages.

* cited by examiner

Primary Examiner — James A English
Assistant Examiner — Marlon A Arce
(74) Attorney, Agent, or Firm — Hinshaw & Culbertson LLP; Roger M. Masson, Esq.

(57) ABSTRACT

A spread axle assembly for a trailer has the ability to pivot about itself to achieve a storage configuration that advantageously shortens the overall length of the trailer and reduces tire wear. It also has the ability to extend between a close position in which the rear axle of the trail is proximate to its axle and one or more spread or extended positions for better distribution of a load carried by the trailer.

13 Claims, 11 Drawing Sheets

SELF-STORING SLIDING HYDRAULIC BOOSTER FOR TRAILER

CROSS REFERENCE TO RELATED APPLICATION

This application is a non-provisional application of and claims priority to U.S. Provisional Application No. 63/084,876 filed Sep. 29, 2020. The entire disclosure is incorporated herein by reference.

FIELD OF THE INVENTION

The invention relates to tractor-trailers, typically used on the highways, specifically lowboy, open deck and platform trailers, which are often used to carry construction equipment, and more specifically to a spread axle assembly for such trailers.

BACKGROUND

Low-boy trailers (or low boys) have a low deck and are typically used to carry heavy loads including construction equipment and mining equipment such as backhoes because the low deck allows the carried load to pass under bridges and the like and to lower the center of gravity. Spread axles may be used to better distribute the weight of the load across more axles. The spacing between the spread axle and the rear axle of the low boy may be adjusted to accommodate heavier loads in some states; specifically, different states require different spacing for maximum allowed axle loading (for example, 13'1" versus 14'1"). To increase the distance, a spreader bar of the appropriate length is attached to the trailer and spread axle to increase the distance. A need therefore exists for easily increasing the distance between the spread axle and the rear axle of the trailer.

Various states have varying laws regarding the length of a tractor-trailer or a trailer. Generally, the restrictions increase as the length of the trailer increases. Some states will require a pilot car to accompany the tractor-trailer if a certain length is exceeded. When a pilot car is required, operation after dark is prohibited. For example, Oklahoma requires a pilot car if the tractor trailer combination is over 85' in length. Pilot cars typically cost $600 per day. Oklahoma allows 80,000 lbs on 4 axles in a close coupled configuration. Texas requires a 10'-1" spread between the third and fourth axle to maintain the same 80,000 lbs rating on 4 axles. When traveling from Texas to Oklahoma at 80,000 lbs, a pilot car is generally needed to accompany the tractor-trailer or the spread could be reduced to close coupled to eliminate the need for a pilot car in Oklahoma. To achieve a shorter length, a spreader bar if used would have to be removed. The removal or replacement of the spreader bar, like the addition of the spreader bar, is tedious and necessitates an additional piece of equipment. Accordingly, there is a need for a trailer whose spacing between axles can be easily changed especially when transporting heavy loads across two or more states.

When a spread axle is not needed, it is advantageous to carry the spread axle on the trailer to shorten the trailer's overall length, often on the gooseneck of the low boy, due to the legal length restrictions discussed earlier. Also, carrying the spread axle reduces wear on the tires. To carry the spread axle requires an extra piece of equipment (and cost) to move the spread axle onto the gooseneck. Additionally, a few states do not allow the spread axle to be stored on the gooseneck while hauling a permit load (any load which exceeds federal weight, width, height or length restrictions). A need therefore exists to transport the spread axle without use of an additional piece of equipment and not on the gooseneck.

SUMMARY OF THE INVENTION

In one aspect of the invention, a self-storing spread axle assembly for carrying part of a load carried by a trailer is provided. The spread axle assembly has a rear portion having an axle, a front portion for attachment to a trailer, a pivot; and a hydraulic cylinder attached to the front portion and the rear portion and arranged to pivot the rear portion around the pivot and above the front portion as the hydraulic cylinder goes from an extended state to a compact state. The hydraulic cylinder has a piston rod. Preferably, the axle is substantially horizontal and the pivot has a pivot axis that is substantially horizontal and substantially perpendicular to the longitudinal direction of the trailer.

Preferably, in addition, the spread axle assembly has a stand for holding the rear portion above the front portion.

Preferably, the pivot is a first pivot and the rear portion has a pitch and the spread axle assembly also has a second pivot around which the rear portion pivots relative to the front portion, the second pivot arranged to allow the rear portion to pivot up or down to compensate for unevenness of a surface supporting the assembly. The spread axle assembly may also have a hydraulic suspension and the axle is attached to the hydraulic suspension. The hydraulic cylinder is hydraulically connected to the hydraulic suspension.

Preferably, the spread axle assembly also has a pivot permitting the axle to turn right or left relative to the front portion. Generally, the pivot has a pivot axis that is substantially vertical. Preferably, there is also a latch mechanism for locking the axle in a position substantially perpendicular to a longitudinal direction of the trailer.

Preferably, the front portion of the spread axle assembly includes a plurality of beams extending longitudinally substantially parallel to a longitudinal direction of the trailer.

In another aspect of the invention, a trailer for transporting a load is provided. The trailer has a coupler for attachment to a tractor. The coupler is located at a front end of the trailer. The trailer also has a rear axle for wheels and for supporting the load. The trailer also has an axle assembly located behind the rear axle. The axle assembly has an axle for supporting the load. The axle assembly may be the same as the spread axle assembly discussed earlier. The trailer has a telescopic beam extending over the rear axle and attached to the axle assembly. The telescopic beam allows the distance between the rear axle and the axle to be selectively adjusted.

Preferably, the telescopic beam has an aperture corresponding to a distance of 13'1" or 14'1" between the rear axle and the axle. Preferably, the trailer has a latch mechanism for the aperture in the beam. The trailer also has hose supports selectively insertable in the apertures.

Preferably, the telescopic beam has an external beam and an internal beam slidable within the external beam. Preferably, the internal beam is attached to the axle assembly. Preferably, the trailer has a first slide wheel for contacting a top surface of the internal beam proximal an outlet of the external beam where the internal beam enters the external beam. The first slide wheel facilitates the telescoping of the telescoping beam. Preferably, the trailer has a second slide wheel for contacting a bottom internal surface of the external beam proximal an end of the internal beam and attached to the internal beam. The second slide wheel facilitates the telescoping of the telescoping beam.

Preferably, the trailer has two telescopic beams extending over the rear axle and attached to the axle assembly. Preferably, the trailer has a frame attached to the coupler and the rear axle and the two telescopic beams are part of the frame.

Preferably, the trailer has rear wheels attached to the rear axle and the axle assembly also has a rear portion having the axle, a front portion attached to the telescopic beam, a pivot, and a hydraulic cylinder. The hydraulic cylinder is attached to both the front portion and the rear portion and is arranged to flip the rear portion around the pivot and above the front portion and above the rear wheels as the hydraulic cylinder goes from an extended state to a compact state.

In still another aspect of the invention, a method of storing and transporting a spread axle assembly of a trailer on the trailer is provided. The spread axle assembly has (1) a rear portion having an axle, (2) a front portion attached to the trailer, (3) a pivot and (4) a hydraulic cylinder attached to both the front portion and the rear portion. The spread axle assembly can be the same as the one previously discussed. The trailer can be the same as the one previously discussed. The method includes pulling the rear portion towards the front portion with the hydraulic cylinder causing the rear portion to pivot around the pivot and to be positioned over the front portion and preferably over rear wheels attached to rear axle of the trailer.

The method can include attaching a stand to hold the rear portion over the front portion. Additionally, the method can include transporting the trailer with the rear portion over the front portion and preferably, with the stand holding the rear portion over the portion and preferably over the rear wheels of the trailer.

In yet another aspect of the invention, a method of adjusting the distance between the rear axle of a trailer and an axle of a spread axle assembly is provided. The trailer has a coupler for attachment to a tractor. The coupler is located at a front end of the trailer. The trailer also has a telescopic beam extending over the rear axle and attached to the spread axle assembly. The trailer and the spread axle assembly can be the same as the ones previously discussed. The method includes telescoping the telescopic beam in or out until a desired distance is achieved and locking an inner beam of the telescopic beam relative to the outer beam of the telescopic beam.

Preferably, telescoping the telescopic beam includes setting a brake on the spread axle assembly and towing the trailer towards or away from the spread axle assembly.

Preferably, the locking of the inner beam of the telescopic beam relative to the outer beam includes inserting a deadbolt into the telescopic beam.

Preferably, the inner beam has a plurality of spaced apart apertures, wherein the locking comprises inserting a deadbolt into one of the apertures. Preferably, the also includes inserting a support into one of the apertures and supporting a hydraulic hose, an air hose or an electrical wire extending from the trailer to the spread axle assembly with the support.

Generally the trailer and spread axle assembly are suitable to be used on the highway. In particular, they comply with laws and regulations for highway usage.

DETAILED DESCRIPTION OF THE INVENTION

Figure 1:
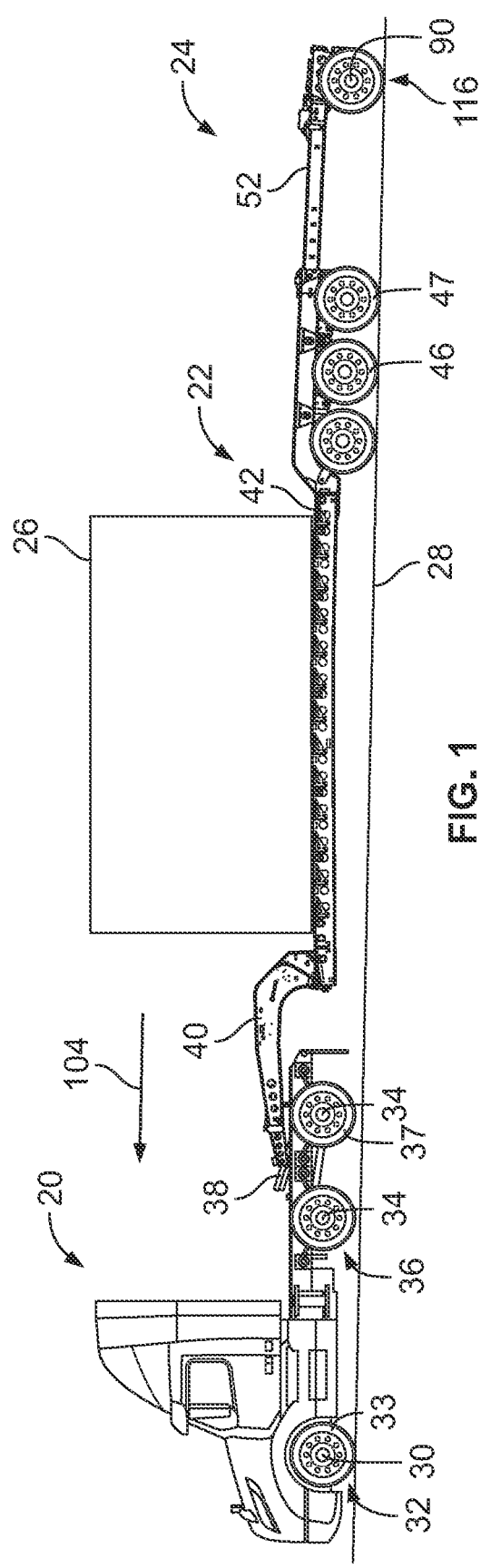
FIG. 1 is an elevation view of a tractor pulling a lowboy trailer with a booster in an extended position carrying a load.

FIG. 1 illustrates the left side of a tractor 20 pulling a trailer 22 having a spread axle assembly 24 and carrying a load 26 (shown schematically as a box) on a surface 28 (such as a road or ground if off road). The right side is substantially similar to the left side. Tractor 20 may be any kind of tractor include ones suitable for on-road use and ones for off-road use (not including railroads). Typically, tractor 20 has a steering axle 30 attached to two steering wheels 32 including tires 33 and one or more drive axles 34, each attached to four drive wheels 36 including tires 37, and a suitable trailer hitch 38 for attaching tractor 20 and trailer 22 together.

Figure 2:
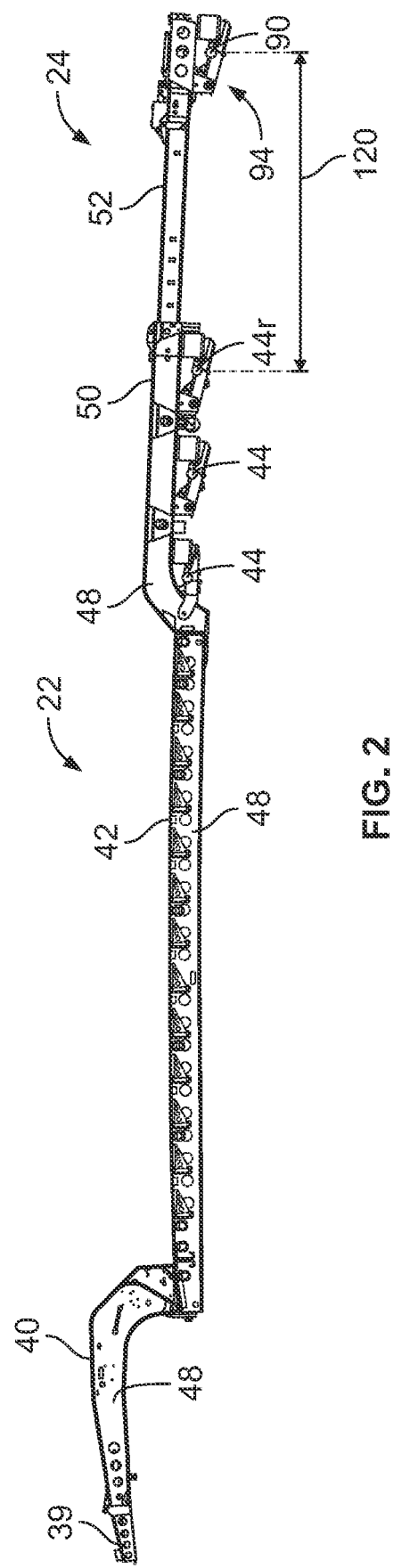
FIG. 2 is an elevation view of the lowboy trailer shown in FIG. 1 (without wheels) with the booster in the extended position.

With reference to FIGS. 1 and 2, trailer 22 may be any suitable trailer including a lowboy trailer or an open deck or platform trailer. As illustrated in the figures, trailer 22 is a lowboy trailer which is frequently used for hauling large and heavy equipment particularly construction and mining equipment. At its front end 39, trailer 22 has a gooseneck 40 having a hitch coupler such as a kingpin for coupling with trailer hitch 38. Gooseneck 40 may be removable allowing a load 26 to drive onto trailer 22 (and trailer deck 42). Typically, there can also be conventional electrical, air or hydraulic connections, wires or hoses (not shown) between the tractor 20 and trailer 22 for operating the brakes, brake lights, etc. and extending to spread axle assembly 24. Trailer 22 has a support surface or trailer deck 42 supporting load 26 and one or more trailer axles 44, typically two or three axles 44, attached to trailer wheels 46 including tires 47. The last of axles 44, or rear trailer axle, is denoted by reference numeral 44*r*.

With particular reference to FIGS. 1, 2, 5 and 8, trailer 22 has a trailer frame 48 extending over axles 44 and through gooseneck 40 and includes two or more parallel beams 50. The hitch coupler is attached, preferably mounted, to frame 48. Beams 50 are of the box type, preferably having 4 closed sides for most of their length. Inside each beam 50 is a beam 52, which can also be of the box type, which can be slid in and out of beam 50. The combination of one beam 50 and one beam 52 may be considered to constitute a single telescopic beam that can telescope in and out. Beams 52 are shown extended out in FIGS. 1, 2, and 5-8 and retracted in FIGS. 3 and 4. Beams 52 have spaced apertures 54 which in conjunction with a latch mechanism 56 locks the extension of beams 52 relative to beams 50. Latch mechanism 56 is attached to frame 48 and can be a conventional air-operated deadbolt latch having a bolt 56a that closely fits apertures 54 and can be withdrawn or inserted into an aperture 54. A switch 57 may be used to operate the bolt. Preferably, there are two latch mechanisms 56, one for each beam 52. The bolt can be secured in the locked position by a clevis pin. Preferably, the bolt extends through both beam 50 and beam 52. Latch mechanism 56 could also be a solenoid, a manually operated or hydraulically operated deadbolt latch.

Figure 5:
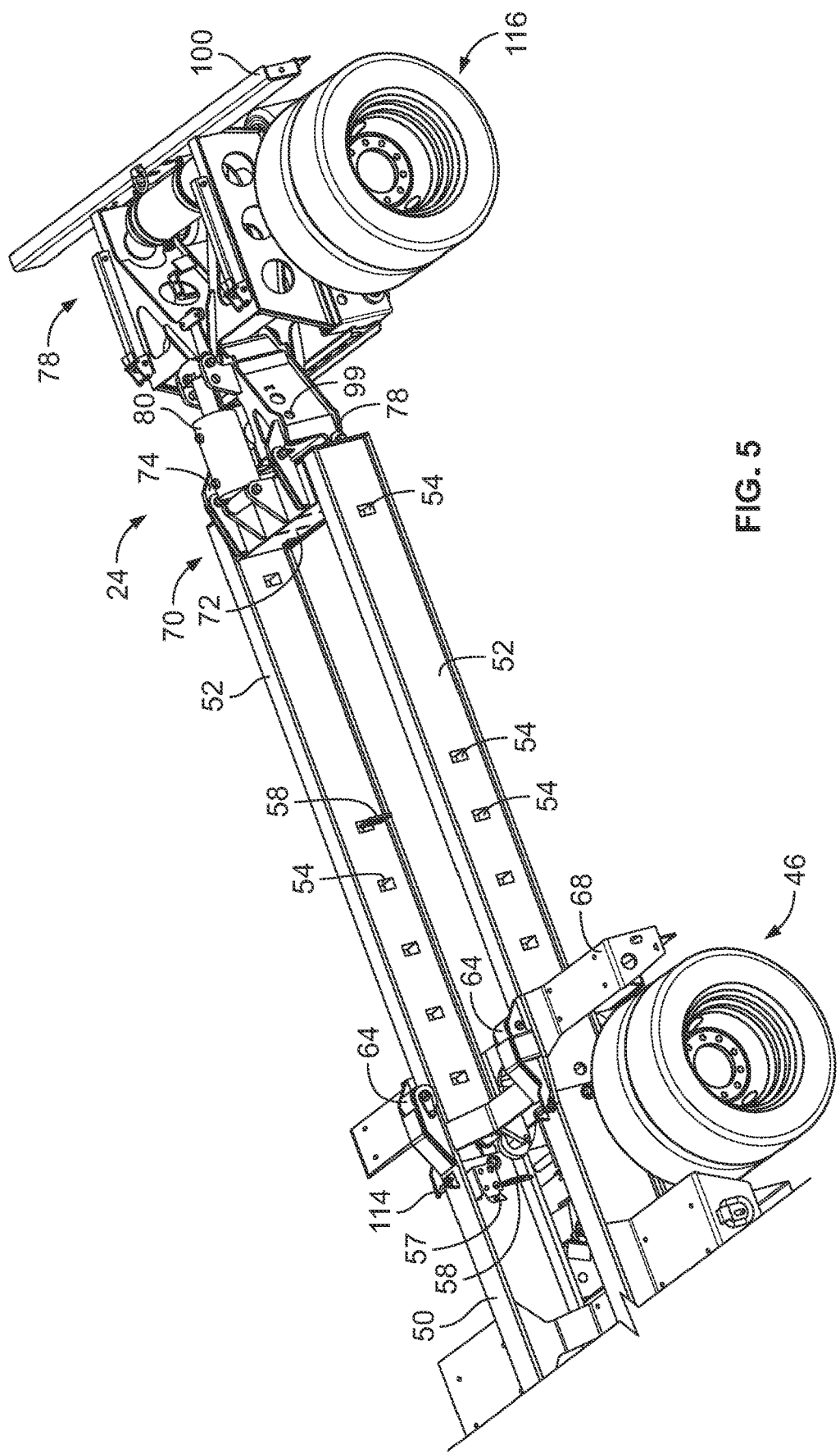
FIG. 5 is a perspective view from above and from the left of the rear portion shown in FIG. 3 with the booster in the extended position. The wheels on the right side have been omitted for clarity.
Figure 8:
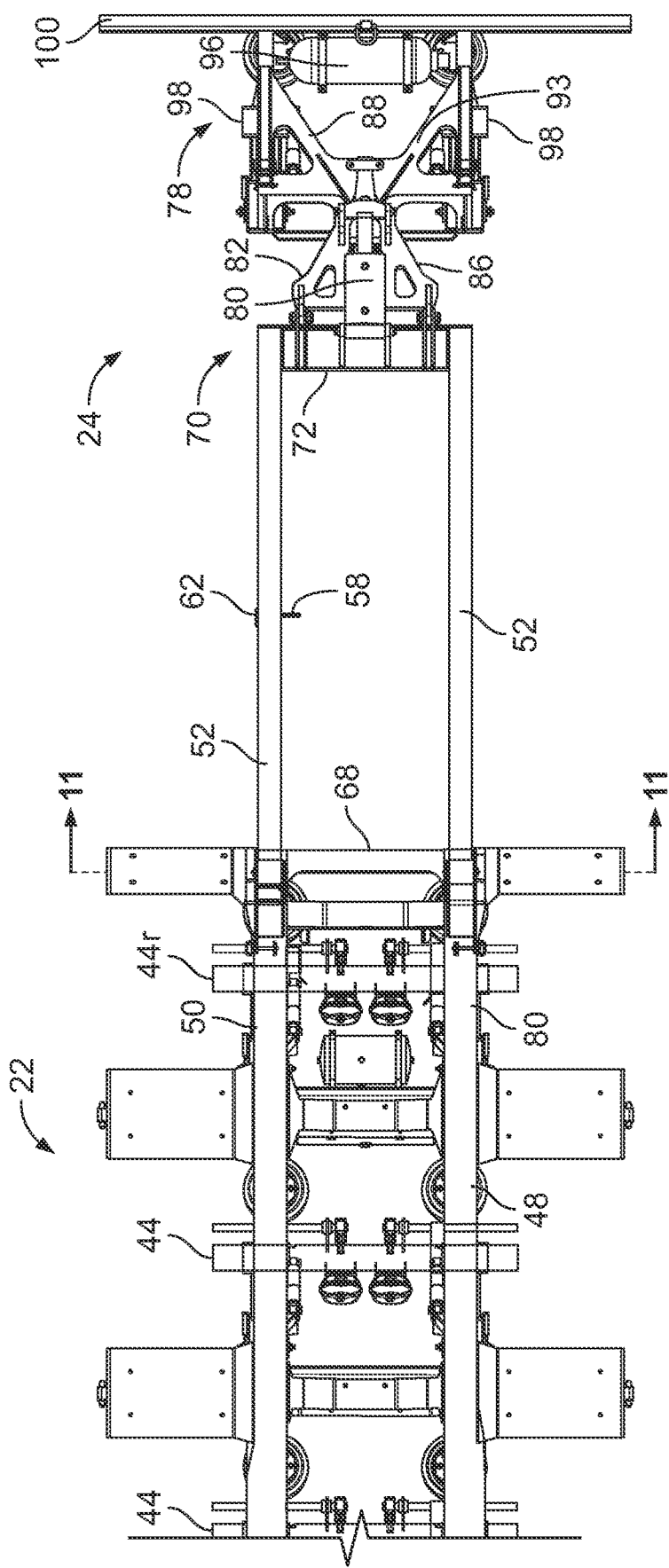
FIG. 8 is a plan view from above of the booster shown in FIG. 1 without the rear axle and wheels.
Figure 12:
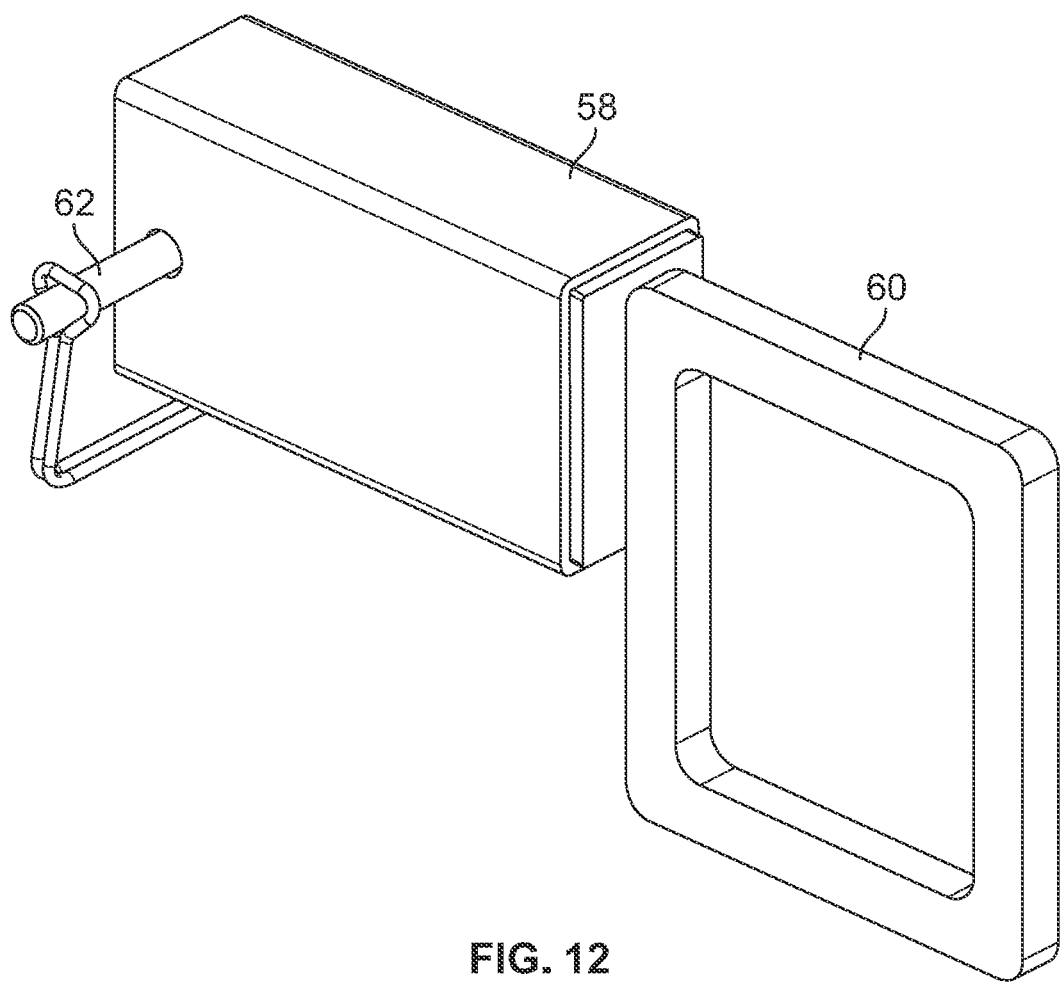
FIG. 12 is a perspective view of a hose support shown in FIG. 5.

As shown in FIGS. 5 and 8, there is a hose support 58 inserted into one of apertures 54. Additional hose supports 58 may be used as necessary. As shown in FIG. 12, hose support 58 has a loop 60 through which conventional air and hydraulic hoses and electrical wires (not shown) can be run so that such hoses and wires can extend from rear axle 44r to spread axle assembly 24. Hose support 58 is held in place in an aperture 54 by loop 60 on one side and by a pin 62 on the other side. Removal of pin 62 allows hose supports to be removed and placed in appropriate apertures 54 depending on the degree of extension or retraction of beams 52.

Figure 11:
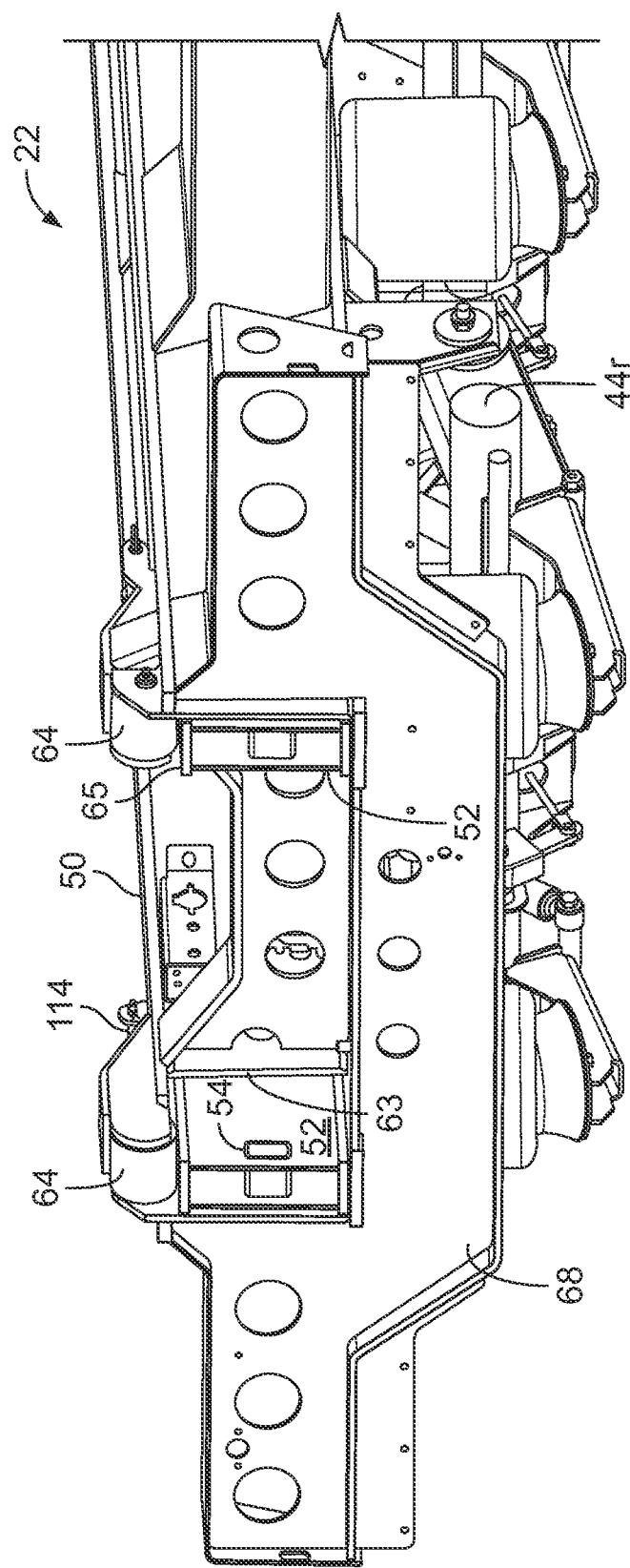
FIG. 11 is a cross-sectional perspective view from the side along line 11-11 shown in FIG. 8.
Figure 13:
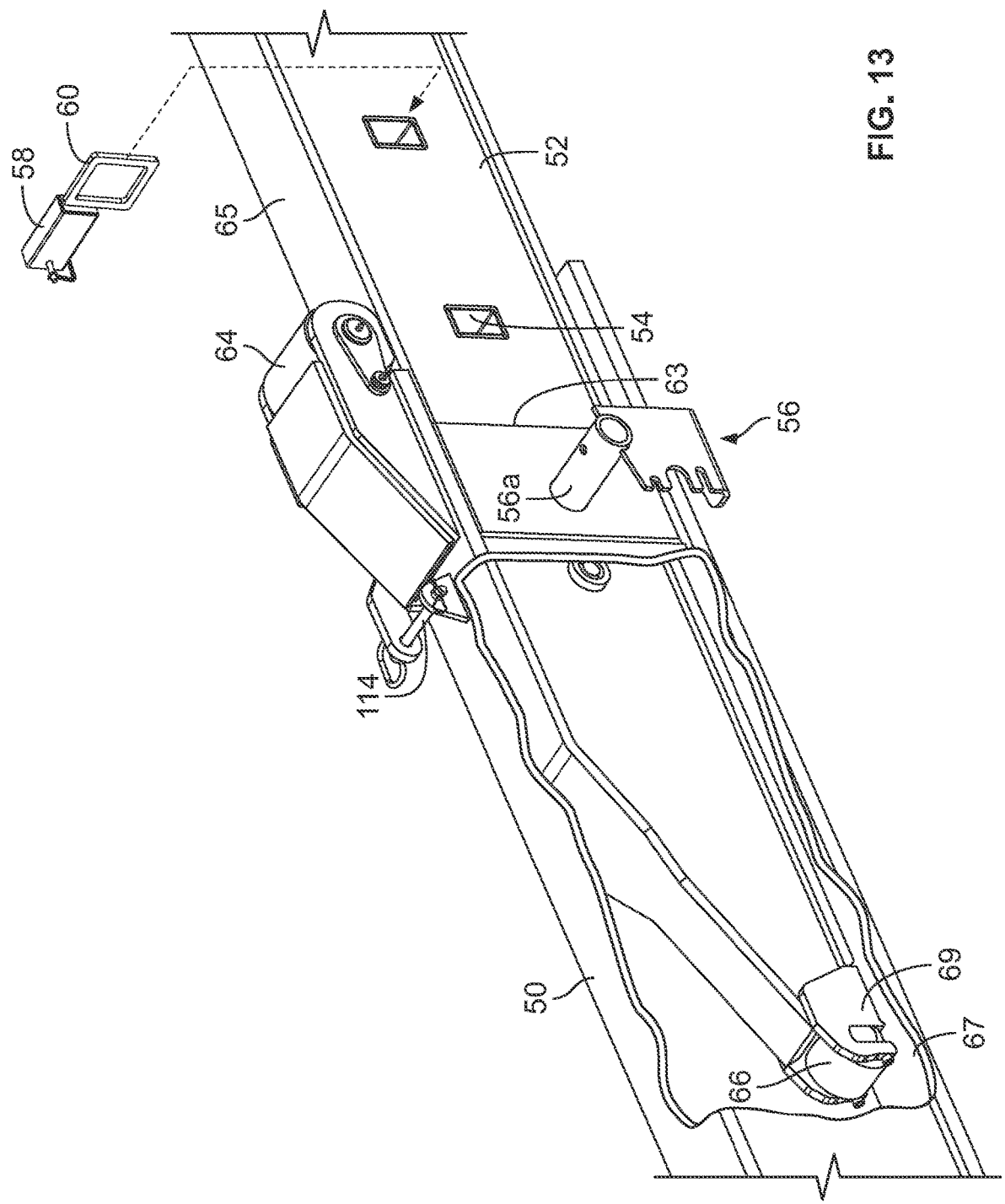
FIG. 13 is a perspective view of the front end of a beam shown in FIG. 5.
Figure 14:
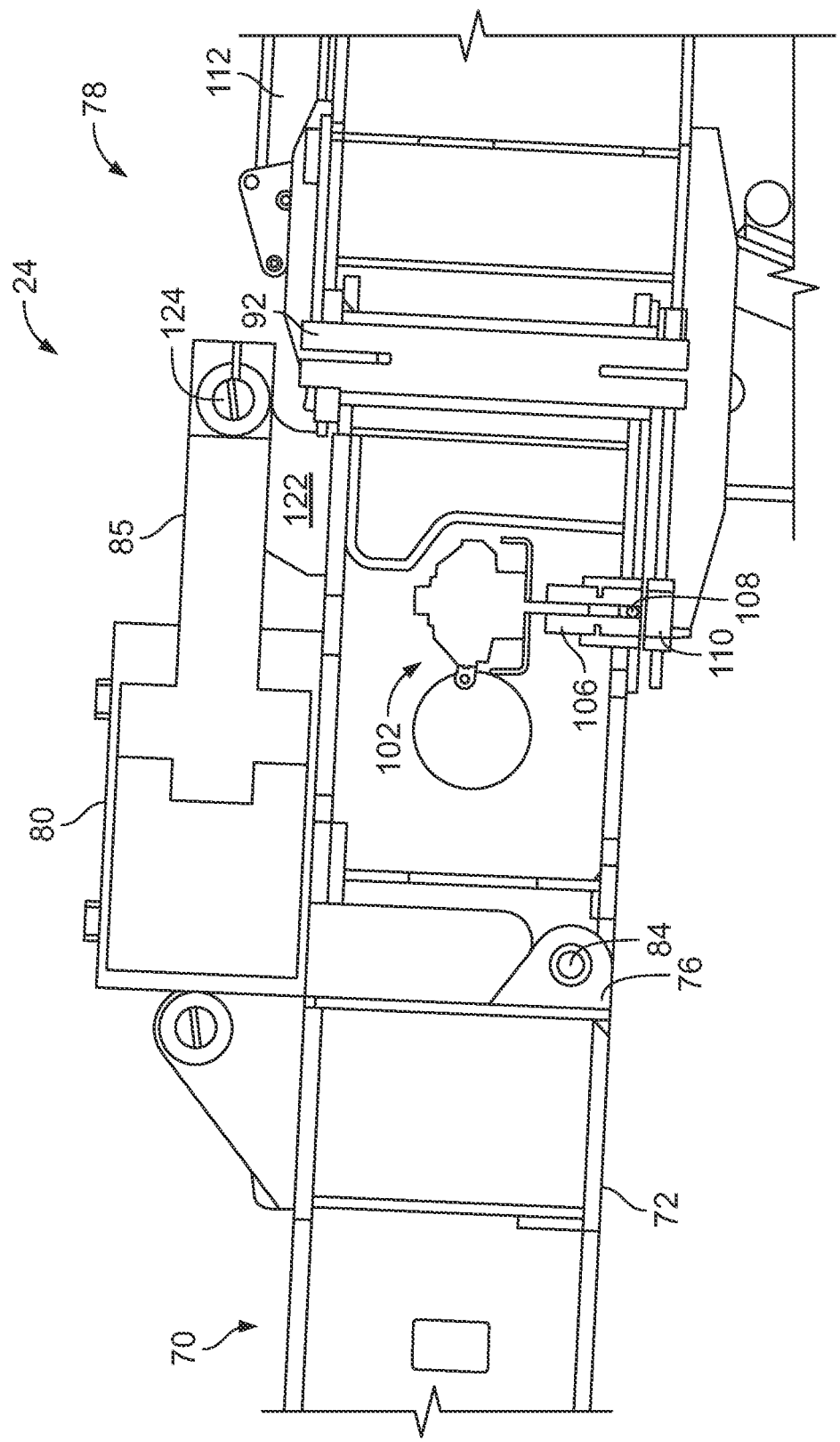
FIG. 14 is a cross-sectional perspective view from the side along line 14-14 shown in FIG. 10.

To facilitate the telescoping of beams 50 and 52, preferably two slide wheels are provided. As can be best seen in FIGS. 5 and 11, located close to each outlet 63 of beam 50, where beam 52 enters beam 50, is a slide wheel 64 which is in contact with a top surface 65 of beam 52. As can be best seen in FIG. 13, at the end 69 of beam 52 is a slide wheel 66. Slide wheel 66 is located inside beam 50. It contacts an inner bottom surface 67 of beam 50.

Behind rear axle 44r is a rear bumper 68 in case spread axle assembly 24 is disconnected from trailer 22.

Turning now to spread axle assembly 24, which is shown in greater detail in FIGS. 3-10, beams 52 are attached to a front portion 70 of spread axle assembly 24. Front portion 70 has a cross bar 72, which are attached to beams 52. Spread axle assembly 24 also has one or more upper hinges 74 and one more lower hinges 76, a rear portion 78, and a hydraulic cylinder 80. Hinges 74 and 76 connect front portion 70 and rear portion 78 together and permit rear portion 78 to pivot vertically relative to front portion 70. Hinges 74 and 76 have pivot axes 75 and 77, respectively, that are substantially perpendicular to a longitudinal direction 104 of trailer 22. Preferably there are two upper hinges 74, each having removable upper pivots or hinge pins 82, which are substantially horizontally aligned. Preferably there are two lower hinges 76, each having removable lower pivots or hinge pins 84, which are substantially horizontally aligned.

Hydraulic cylinder 80 is pivotally attached to cross bar 72 and pivotally attached to rear portion 78. Hydraulic cylinder 80 is of conventional construction and has conventional parts including a piston and a piston rod 85. Piston rod 85 is shown connected to rear portion 78, but the cylinder could be reversed such that piston rod 85 is attached to cross bar 72. Hydraulic cylinder 80 is in an extended state as shown in FIG. 4 and in a compact state in FIG. 3. Piston rod 85 is attached to rear portion 78 by a clevis 122 and a pin 124. Clevis 122 has two positions (a close position 126a and a distal position 126b) for pin 124. Each position 126 is formed by a pair of opposed apertures in clevis 122.

Figure 9:
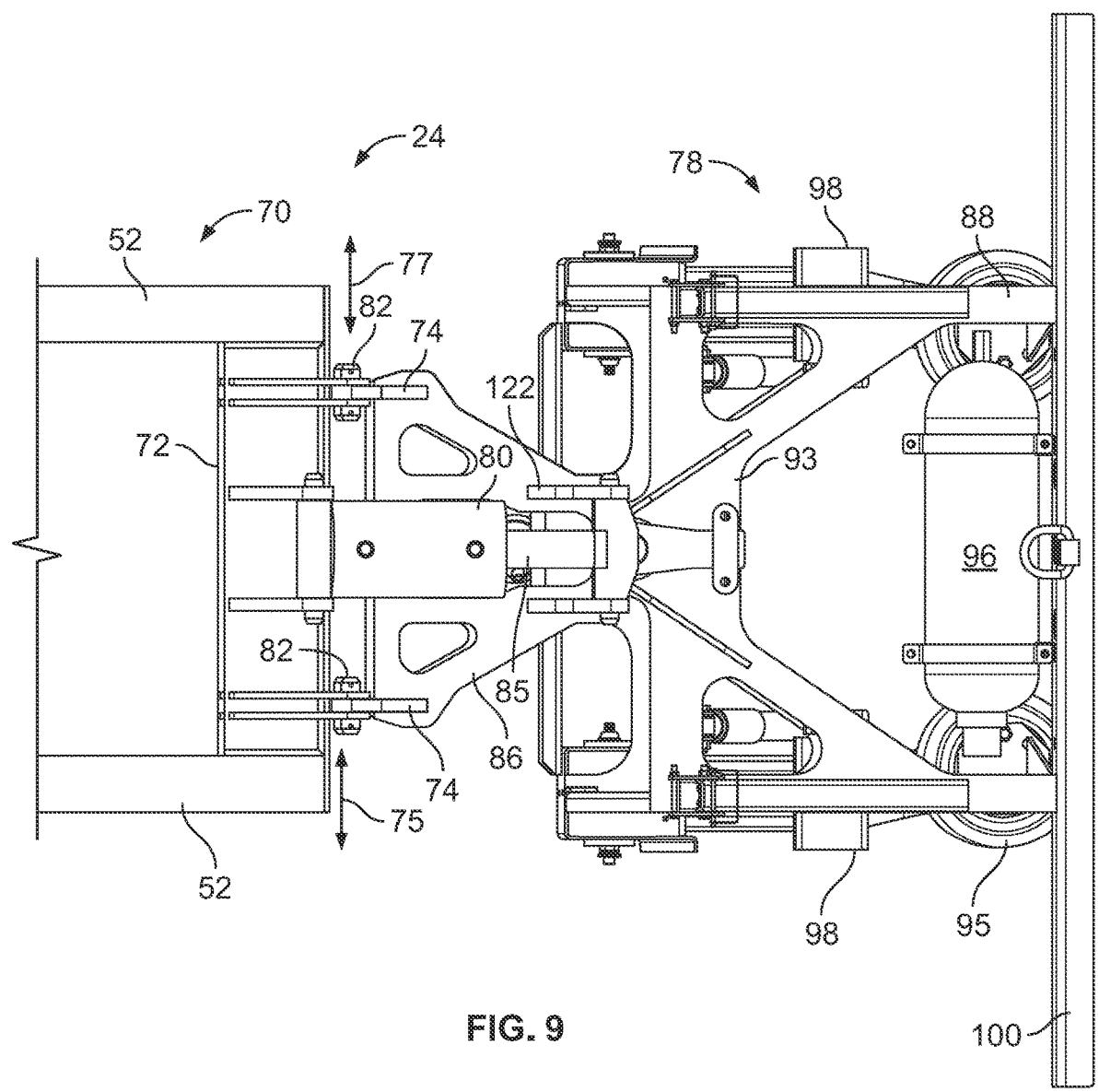
FIG. 9 is a plan view from above of the booster shown in FIG. 1 without the rear axle and wheels.
Figure 10:
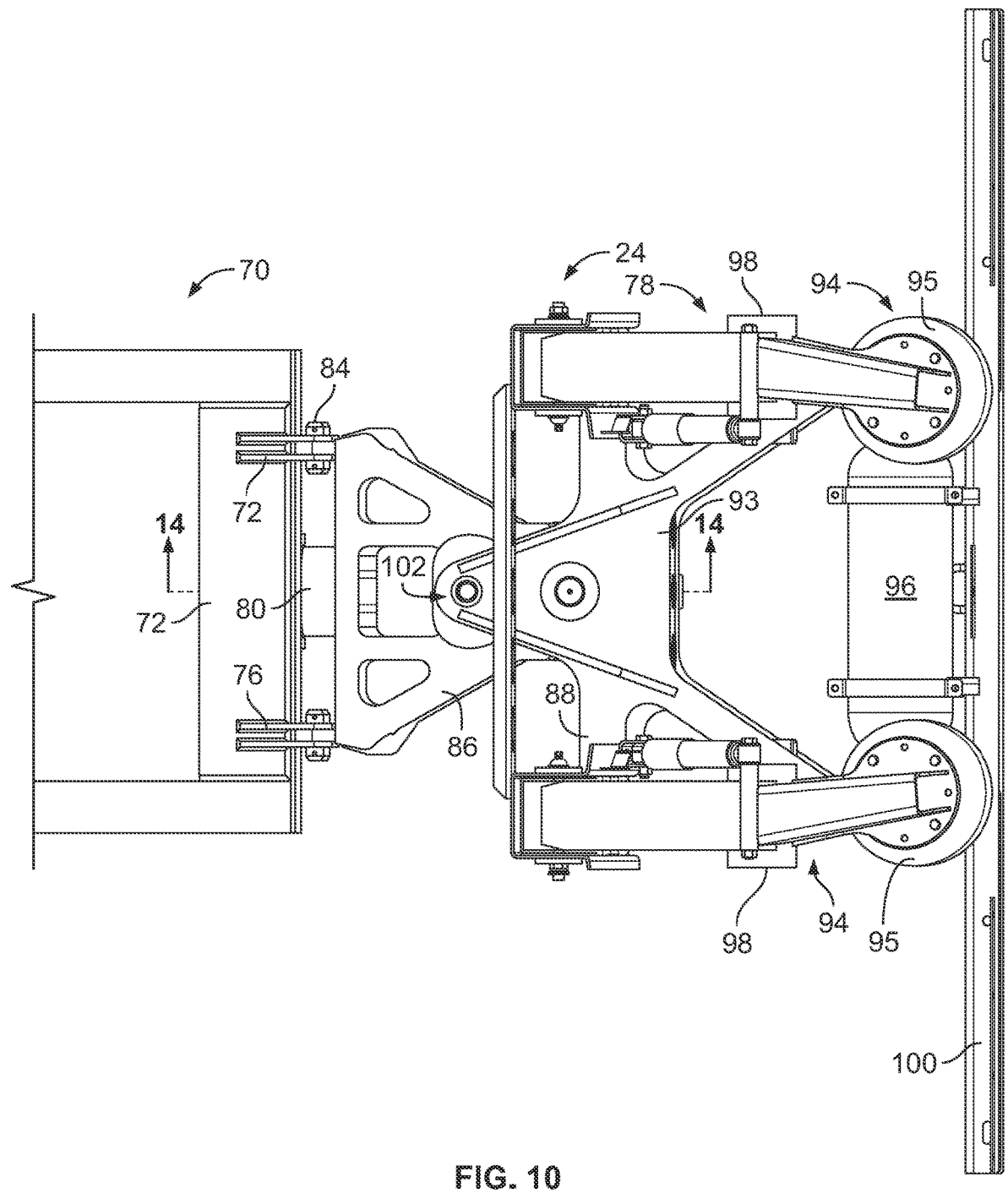
FIG. 10 is a plan view from below of the booster shown in FIG. 1 without the rear axle and wheels.

Rear portion 78 has a triangular frame 86, a rear frame 88, and one or more axles 90. Rear frame 88 is pivotally attached to triangular frame 86 by pivot 92, which is substantially vertically aligned when trailer 22 is on level ground, allowing axle 90 to turn left or right relative to triangular frame 86 and front portion 70. Rear frame 88 has a central triangular frame portion 93. Axle 90 is attached to rear frame 88 by a suspension 94. Suspension 94 may be a spring suspension, an air-ride suspension, a hydraulic suspension or a combination. As shown, suspension 94 is an air-ride suspension having air bags 95. The hydraulic system for spread axle assembly 24 (and suspension 94) includes hydraulic accumulator 96, hydraulic cylinder 80, and related conventional hydraulic hoses, tubing, etc. (not shown). In FIGS. 8-10, axle 90 has been omitted for clarity, but cradles 98, which are part of suspension 94, for axle 90 are shown. Conventionally, trailer 22 or tractor 20 has a hydraulic power pack (not shown) which can be used for operating hydraulic cylinder 80 and charging suspension 94. The hydraulic system of spread axle assembly 24 also has a hydraulic lock valve 99 (shown schematically) for isolating the hydraulic system of spread axle assembly 24 from the hydraulic system of the rest of trailer 22.

At the very back of spread axle assembly 24 is located a rear light bar 100.

Rear portion 78 has a latch mechanism 102 for locking axle 90 in a position substantially perpendicular to longitudinal direction 104 (substantially horizontal and in the plane of the paper in FIG. 1) of trailer 22. Latch mechanism 102 is located proximal to the tip of central triangular frame portion 93. Latch mechanism 102 includes a deadbolt 106 which can extend through and closely fits an aperture 108 in triangular frame 86 and an aperture 110 in rear frame 88. Deadbolt 106 may be air-operated using air switch 111 (shown schematically), hydraulically operated, manually operated or electrically-operated such as a solenoid.

Spread axle assembly 24 also has one or more stands 112 (two shown) which are pivotally attached to one of front portion 70 and rear portion 78 and removably attached to the other by a clevis pin 114 or similar. Axle (or axles 90) have wheels 116 (typically four per axle) having tires 118.

Figure 3:
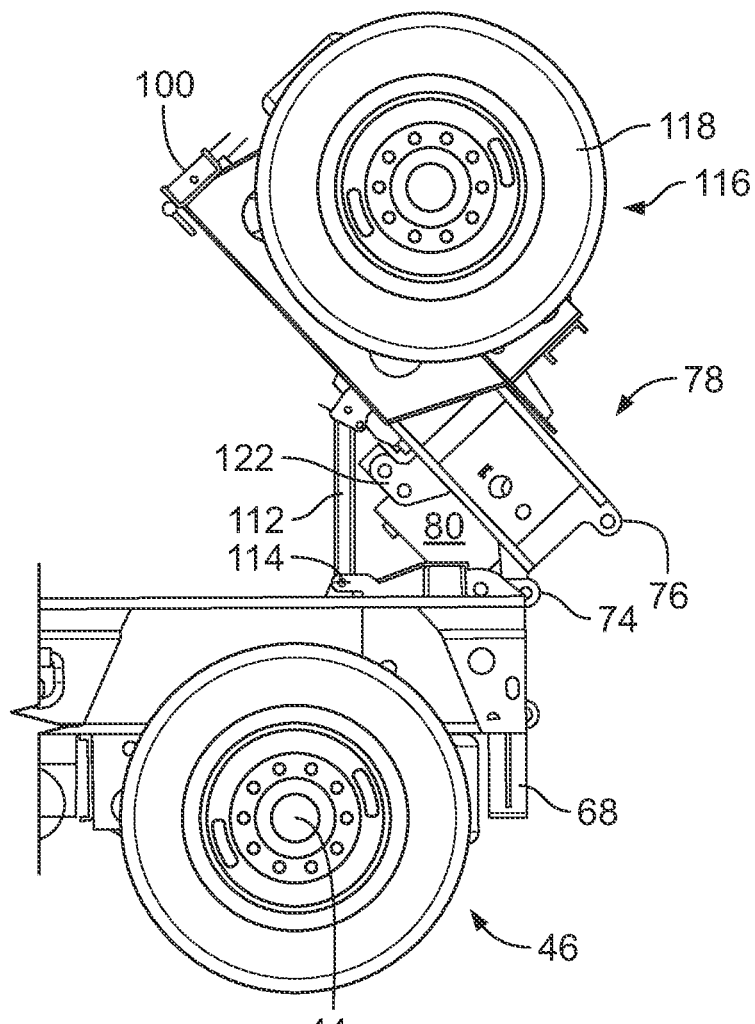
FIG. 3 is an elevation view of a rear portion of the trailer shown in FIG. 1 with the booster in a storage position.
Figure 4:
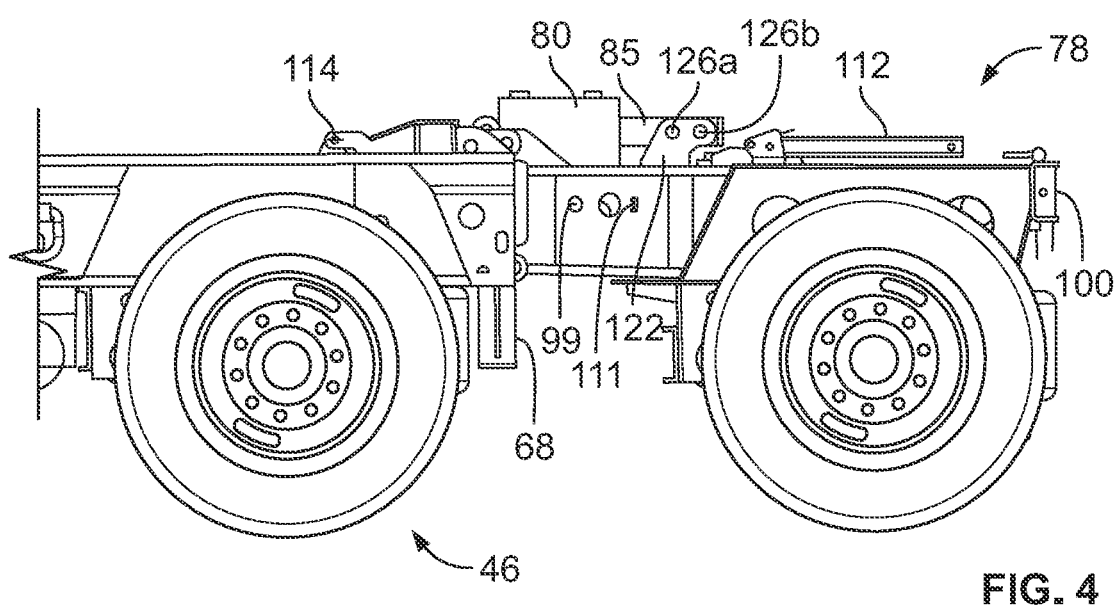
FIG. 4 is an elevation view of the rear portion shown in FIG. 3 with the booster in the close coupled position.
Figure 6:
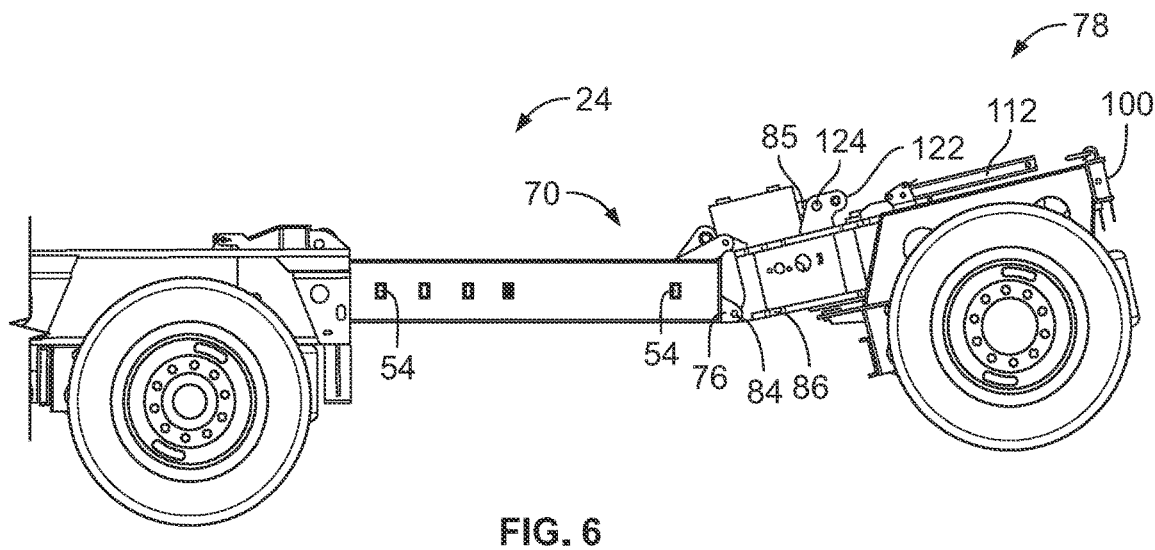
FIG. 6 is an elevation view of the rear portion shown in FIG. 5 with the rear axle articulated downwards.
Figure 7:
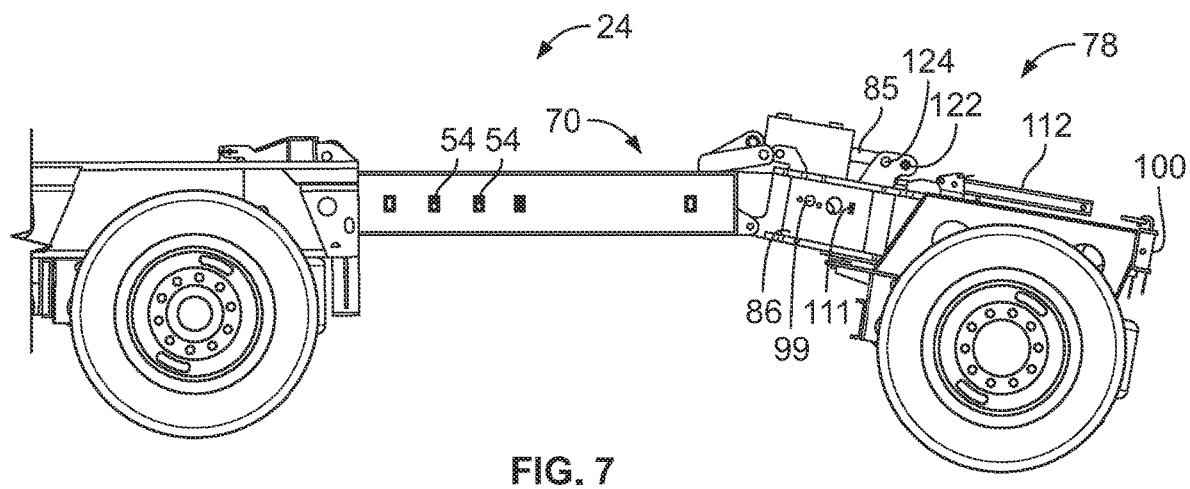
FIG. 7 is an elevation view of the rear portion shown in FIG. 5 with the rear axle articulated upwards.

In operating trailer 22, the operator, without any assistance, will be able to easily change spread axle assembly 24 from a storage position shown in FIG. 3, to a close coupled position (see FIG. 4), to a spread or extended position (see FIG. 5), and to positions between the close coupled position and the spread or extended position. Additionally, after the appropriate non-storage position is selected the spread axle assembly may be operated in selected to a hydraulic booster configuration to carry a portion of load 26 and allowing pivoting up and down due to surface unevenness as shown in FIGS. 6 and 7.

When it is desired to move to booster from the stored position (see FIG. 1), a conventional hydraulic power pack (not shown) on trailer 22 or tractor 20 is started. Stands 112 are un-pinned, i.e., clevis pin 114 is removed from stands 112. The hydraulic controls of the power pack are used to extend out piston rod 85 causing rear portion 78 to pivot around upper pivots 82 and to lower to the ground. Once piston rod 85 is fully extended and tires 118 on surface 28, lower hinge pins 84 are installed in lower hinges 76. The trailer hydraulic power pack can then be shut off. Spread axle assembly 24 is in the close coupled position (see FIG. 4).

If it is desired to move spread axle assembly 24 to a spread or extended position, the brakes are set on axle 90/wheels 116. The bolts of latch mechanisms 56 are released from apertures 54 with switch 57 after removing the clevis pin. Tractor 20 is slowly moved forward towing trailer 22 forward and extending beams 52 (or telescoping the telescopic beams out) until they are close to the desired position. Switch 57 is activated. The tractor and trailer are slowly moved until the bolts of latch mechanisms 56 engage the appropriate apertures 54. Apertures 54 are located advantageously along beams 52 to achieve, for example, a distance 120 of 13.1 and 14.1 feet between rear axle 44*r* and axle 90. Shorter distances are also advantageous for reducing the overall length of trailer 22 such as 12'1", 11'1", 10'1", 9'2" and a close position. Optionally, hose supports 58 can be inserted into apertures 54 and hoses and wires supported by hose supports 58.

Before spread axle assembly 24 is used, it is preferable to allow pivoting around pivot 92 to eliminate or reduce skidding of tires 118 around corners. To do so, deadbolt 106 is disengaged from at least one of aperture 108 and aperture 110 using air switch 111. The trailer can now be operated with spread axle assembly 24 as a fixed booster.

If it is desired to operate the spread axle assembly 24 as a hydraulic booster, the hydraulic power pack is started and pin 124 is removed from distal position 126*b*. Using the hydraulic controls of the hydraulic power pack, piston rod 85 is moved inwardly and pin 124 is inserted into close position 126*a* thereby reattaching piston rod 85 to rear portion 78. Next, upper pivots or hinge pins 82 are removed. Using the hydraulic controls, hydraulic accumulator 96 is charged pushing axle 90 downwardly relative to rear frame 88 thereby shifting an increasing amount of the weight of load 26 to axle 90 until the desired loading on axle 90 is achieved. Once the desired loading has been reached, hydraulic lock valve 99 is closed to prevent pressure loss. Spread axle assembly 24 can now be operated as a hydraulic booster. Hydraulic cylinder 80, which remains in hydraulic communication with hydraulic accumulator 96, gives axle 90 increased travel to keep axle loadings consistent over uneven roads (see FIGS. 6 and 7). It is possible to achieve an additional 18" of total travel up and down in the booster configuration.

If it is desired to return spread axle assembly 24 from its hydraulic booster configuration to the stored position (see FIG. 1), hydraulic lock valve 99 is opened. The hydraulic pressure in hydraulic accumulator 96 is relieved using the hydraulic controls. The hydraulic power pack is started and upper hinge pins 82 are installed in upper hinges 74. Deadbolt 106 is engaged with both aperture 108 and aperture 110 using air switch 111 to prevent pivoting around pivot 92, which could be dangerous during transport.

The connection of piston rod 85 to clevis 122 is adjusted. First, pin 124 is removed. Next, using the hydraulic controls, piston rod 85 is moved outwardly and piston rod is reattached to clevis 122 by inserting pin 124 into distal position 126*b*. The brakes are set on spread axle assembly 24. The bolts of latch mechanisms 56 are released from apertures 54 with switch 57. Trailer 22 is towed by tractor 20 backwards, telescoping the telescopic beams in until the spread axle assembly gently hits the rear of trailer stops. Switch 57 is activated, engaging latch mechanisms 56 thereby locking beams 52 in the closed position. Next lower hinge pins 84 are removed. Using the hydraulic controls, piston rod 85 is retracted pulling rear portion 78 toward front portion 70 causing rear portion 78 to rise. Stands 112 are pinned to using clevis pins 114. The hydraulic power pack is shut off. The trailer can now be operated with the booster in the stored position (see FIG. 3).

As can be seen, the invention overcomes deficiencies discussed in the background. Additionally, hydraulic cylinder 80 is advantageously used to improve the suspension of the spread axle assembly.

Definitions: As used in this application, substantially vertical and substantially horizontal directions mean that when trailer 22 is on horizontal and level surface 28, e.g., the ground, that the directions are vertical and horizontal, respectively, subject to manufacturing tolerances and normal wear and tear including uneven tire wear. In any case, substantially vertical and substantially horizontal should not deviate more than 5 degrees from vertical or horizontal, respectively. Similarly, substantially perpendicular or substantially parallel reflect manufacturing tolerances and normal wear and tear, but should not deviate more than 5 degrees from perpendicular or parallel, respectively.

While the invention has been described with respect to certain embodiments, as will be appreciated by those skilled in the art, it is to be understood that the invention is capable of numerous changes, modifications and rearrangements, and such changes, modifications and rearrangements are intended to be covered by the following claims.

What is claimed is:

1. A trailer for transporting a load, the trailer comprising:
a coupler for attachment to a tractor, the coupler located at a front end of the trailer;
a rear axle for wheels, the rear axle for supporting the load;
an axle assembly located behind the rear axle, the axle assembly comprising an axle for supporting the load; and
a telescopic beam extending over the rear axle and attached to the axle assembly, the telescopic beam permitting the distance between the rear axle and the axle to be selectively adjusted, wherein the telescopic beam has an aperture corresponding to a distance of 13'1" or 14'1" between the rear axle and the axle.

2. The trailer of claim 1 further comprising a latch mechanism for the aperture in the beam.

3. The trailer of claim 2 further comprising hose supports selectively insertable in the apertures.

4. A trailer for transporting a load, the trailer comprising:
a coupler for attachment to a tractor, the coupler located at a front end of the trailer;
a rear axle for wheels, the rear axle for supporting the load;
an axle assembly located behind the rear axle, the axle assembly comprising an axle for supporting the load; and
a telescopic beam extending over the rear axle and attached to the axle assembly, the telescopic beam permitting the distance between the rear axle and the axle to be selectively adjusted, wherein the telescopic beam comprises an external beam and an internal beam slidable within the external beam.

5. The trailer of claim 4 wherein the internal beam is attached to the axle assembly.

6. The trailer of claim 5 wherein the trailer comprises a first slide wheel for contacting a top surface of the internal beam proximal an outlet of the external beam where the internal beam enters the external beam, the first slide wheel facilitating the telescoping of the telescoping beam.

7. The trailer of claim 6 wherein the trailer comprises a second slide wheel for contacting a bottom internal surface of the external beam proximal an end of the internal beam and attached to the internal beam, the second slide wheel facilitating the telescoping of the telescoping beam.

8. A trailer for transporting a load, the trailer comprising:
a coupler for attachment to a tractor, the coupler located at a front end of the trailer;
a rear axle for wheels, the rear axle for supporting the load;
an axle assembly located behind the rear axle, the axle assembly comprising an axle for supporting the load; and
a telescopic beam extending over the rear axle and attached to the axle assembly, the telescopic beam permitting the distance between the rear axle and the axle to be selectively adjusted, wherein the telescopic beam is a first telescopic beam and the trailer further comprises a second telescopic beam extending over the rear axle and attached to the axle assembly.

9. The trailer of claim 8 wherein the trailer comprises a frame attached to the coupler and the rear axle, the frame comprising the first and second telescopic beams.

10. A trailer for transporting a load, the trailer comprising:
a coupler for attachment to a tractor, the coupler located at a front end of the trailer;
a rear axle for wheels, the rear axle for supporting the load;
an axle assembly located behind the rear axle, the axle assembly comprising an axle for supporting the load; and
a telescopic beam extending over the rear axle and attached to the axle assembly, the telescopic beam permitting the distance between the rear axle and the axle to be selectively adjusted, wherein the trailer has rear wheels attached to the rear axle and the axle assembly further comprises a rear portion having the axle; a front portion attached to the telescopic beam; a pivot; and a hydraulic cylinder attached to both the front portion and the rear portion and arranged to flip the rear portion around the pivot and above the front portion and above the rear wheels as the hydraulic cylinder goes from an extended state to a compact state.

11. A method of adjusting the distance between the rear axle of a trailer and an axle of a spread axle assembly, the trailer having (1) a coupler for attachment to a tractor, the coupler located at a front end of the trailer and (2) a telescopic beam extending over the rear axle and attached to the spread axle assembly; the method comprising:
telescoping the telescopic beam in or out until a desired distance is achieved; and
locking an inner beam of the telescopic beam relative to the outer beam of the telescopic beam, wherein the inner beam has a plurality of spaced apart apertures, wherein the locking comprises inserting a deadbolt into one of the apertures
inserting a support into one of the apertures and supporting a hydraulic hose, an air hose or an electrical wire extending from the trailer to the spread axle assembly with the support.

12. The method of claim 11 wherein telescoping the telescopic beam comprises setting a brake on the spread axle assembly and towing the trailer towards or away from the spread axle assembly.

13. The method of claim 11 wherein the locking comprises inserting a deadbolt into the telescopic beam.

* * * * *